United States Patent [19]
Nguyen et al.

[11] Patent Number: 6,028,777
[45] Date of Patent: Feb. 22, 2000

[54] HIGH FREQUENCY POWER SUPPLY GENERATOR

[75] Inventors: Binh Nguyen, Palo Alto; Masato Toshima, Sunnyvale; Hiroji Hanawa, Sunnyvale; Trung Nguyen, Sunnyvale, all of Calif.

[73] Assignee: Betek Manufacturing, Inc., San Jose, Calif.

[21] Appl. No.: 09/024,994

[22] Filed: Feb. 17, 1998

[51] Int. Cl.⁷ ...................................................... H02M 5/45
[52] U.S. Cl. ............................................................ 363/37
[58] Field of Search .................... 363/17, 18, 19, 363/37, 97

[56] References Cited

U.S. PATENT DOCUMENTS

| | | | |
|---|---|---|---|
| 3,919,656 | 11/1975 | Sokal et al. | 330/51 |
| 4,743,858 | 5/1988 | Everard | 330/10 |
| 4,891,746 | 1/1990 | Bowman et al. | 363/131 |
| 5,187,580 | 2/1993 | Porter, Jr. et al. | 330/207 |

*Primary Examiner*—Matthew Nguyen
*Attorney, Agent, or Firm*—Lyon & Lyon LLP

[57] ABSTRACT

A device for generating high frequency power comprises an AC to DC converter comprising an AC to DC input and AC to DC output, a step down converter comprising a step down input and a step down output, said step down input coupled to the AC to DC output, a radio frequency amplifier comprising a RF input and a RF output, the RF input coupled to said step down output, a first winding comprising a first terminal and a second terminal, the first terminal and said second terminal coupled to said RF output; and a second winding magnetically coupled to said first winding.

22 Claims, 11 Drawing Sheets

FIG. 10

HIGH FREQUENCY POWER SUPPLY GENERATOR

BACKGROUND

1. Field Of The Invention

The invention pertains to the field of high frequency power supply generators, including among other things to power supplies for use with high frequency power supply generators.

2. Background of the Invention

High frequency power has a wide variety of applications in areas ranging from communication to industrial control equipment. Radio frequency power is a group of high frequency power generally having a frequency greater than thirty (30) kilohertz and power levels of up to 10 KW.

In operation a high frequency power supply generator utilizes AC mains power to supply power to a radio frequency amplifier, which is switched on and off according to a high rate drive signal. A device to which the radio frequency amplifier is coupled uses the high frequency power generated by the radio frequency amplifier. Applications utilizing high frequency power supply generators include power amplifiers for radio frequency communication, plasma generators for integrated circuit manufacture, circuit board etching apparatuses, physical vapor deposition chambers, chemical vapor deposition chambers, and devices for various other applications.

Figure 1:
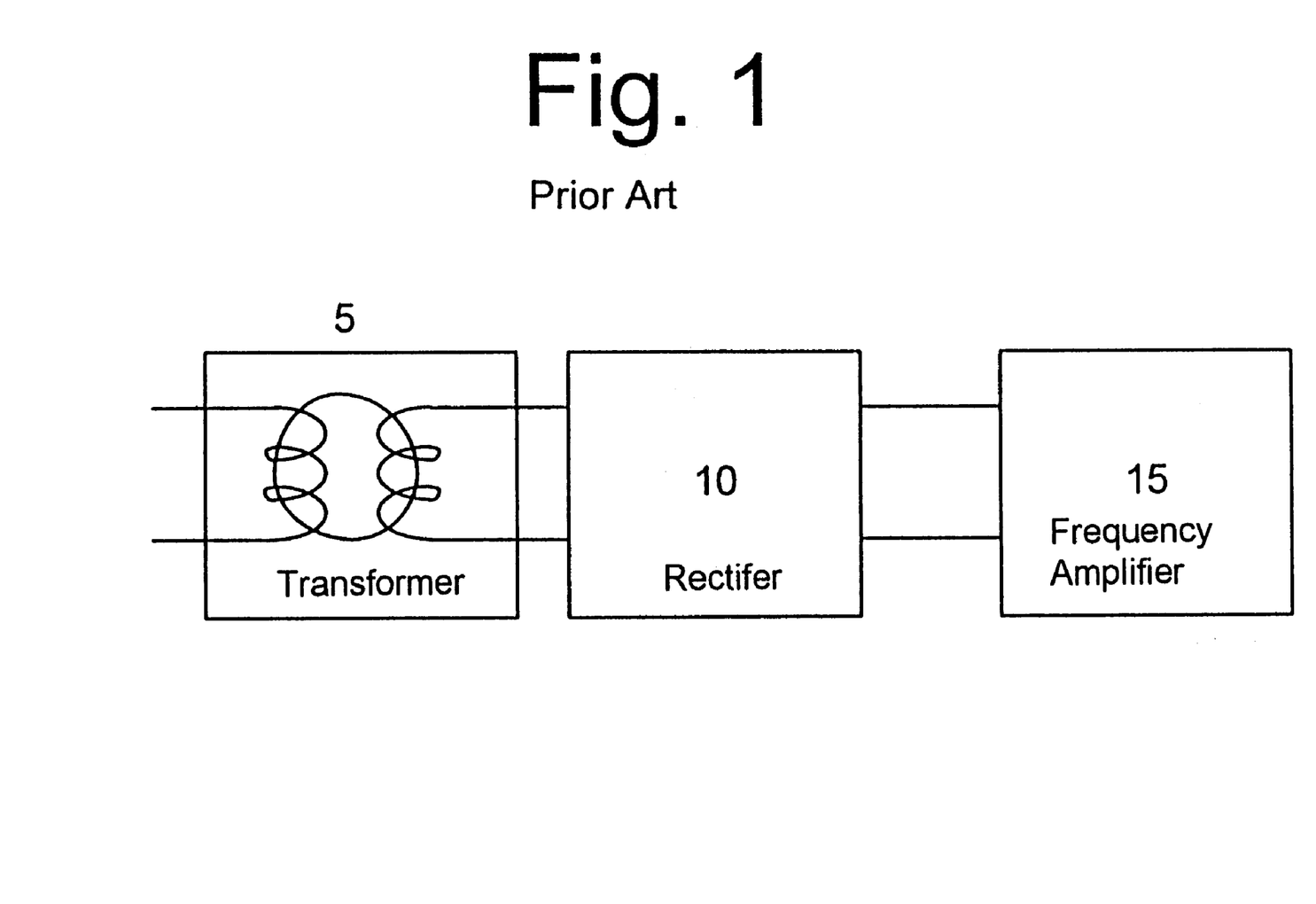
FIG. 1 shows a first known D.C. power supply for supplying power to high frequency power supply generators.

There are two known types of power supplies used to power radio frequency amplifiers in high frequency power supply generators. Referring to FIG. 1, a first known D.C. power supply for supplying power to high frequency power supply generators is shown. Step down transformer 5 reduces the 120-Volt, 208-volt rms., AC mains voltage to a level that can be utilized by the radio frequency amplifier 15. The reduced AC voltage is then rectified by rectifier 10 into a DC voltage that is used to supply power to radio frequency amplifier 15 that supplies a radio frequency signal to a load. Problems associated with the power supply depicted in FIG. 1 include the losses associated with the utilization of transformer 5. These losses include hysterisis losses, eddy current losses and magnetization losses. These losses generate large amounts of heat, which generally use a fan and a heat sink to cool the power supply. The addition of a fan and heat sink increases the bulk, weight and cost of the power supply. The large size of a power supply utilizing a cooling fan and heat sink adds to the drawbacks of using the power supply of FIG. 1. One of these drawbacks is that the high frequency power supply with the fan and heat sink is of a large size that makes it difficult to integrate the high frequency power supply into a small device that uses the high frequency power.

Figure 2:
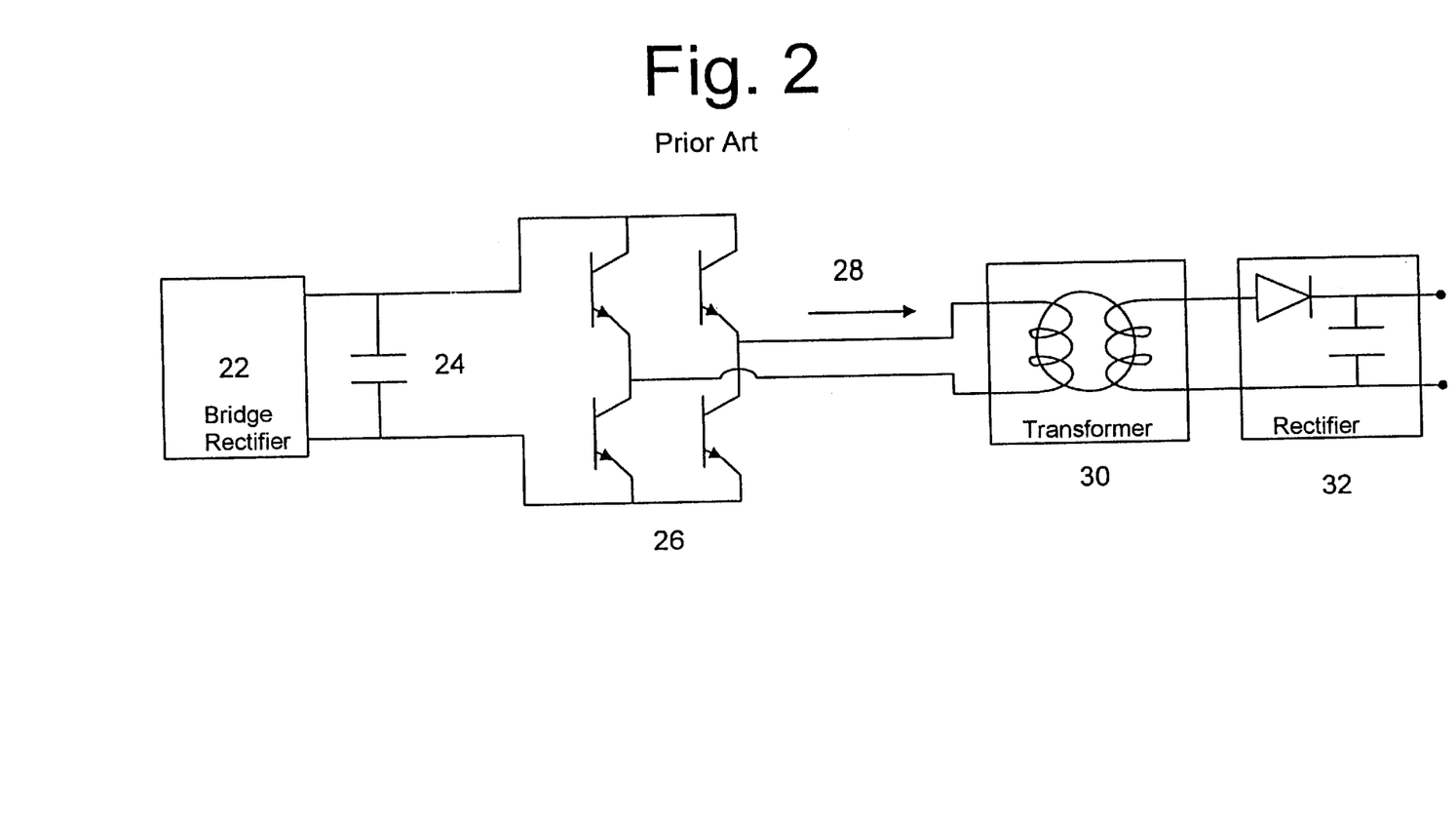
FIG. 2 shows a second known D.C. power supply for supplying power to high frequency power supply generators.

Referring to FIG. 2, a second known power supply utilized for radio frequency amplifiers is shown. The power supply includes a bridge rectifier 22 and a capacitor 24 for generating a DC voltage from the AC mains voltage. The DC voltage is input into a bridge of transistors 26 that is switched at a rate of 100 KHz at the primary side 28 of the transformer 30 so that the voltage at the secondary side, which includes a rectifier 32, is less than the primary side voltage. The voltage output 28 by the bridge of transistors 26 is a square wave. The advantage of the power supply depicted in FIG. 2 over that of FIG. 1 is that transformer 30 is smaller than transformer 5 because transformer 30 can operate at a higher frequency, this also means that less heat is generated by transformer 30 than transformer 5. A problem with the power supply depicted in FIG. 2 is that the addition of a bridge of transistors 26 add material costs to the power supply. Additionally, the bridge of transistors 26 adds losses. Further, the power supply of FIG. 2 while smaller than that of FIG. 1, is still of a large size so as to cause difficulties in integrating the power supply into devices that utilize high frequency power.

In the known power supplies of FIG. 1 and FIG. 2 the secondary side voltage is usually between 50 and 150 volts.

Figure 3:
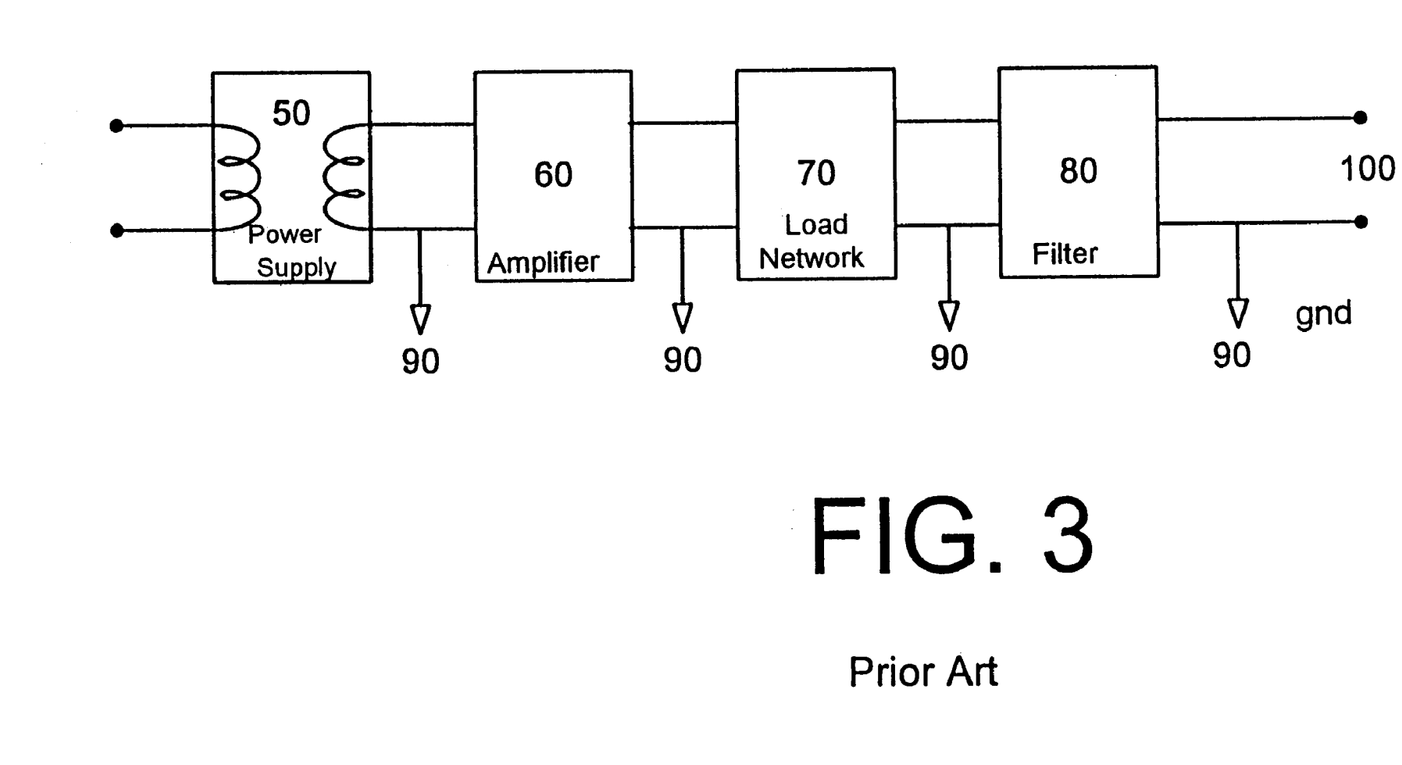
FIG. 3 is a known high frequency power supply generator.

Referring to FIG. 3, a known high frequency power supply generator utilizes a power supply 50 that can be either of the power supplies depicted in FIG. 1 or FIG. 2. The power supply 50 provides power to the radio frequency amplifier 60, which produces the high frequency power that is filtered through a load network 70 and filter 80. As can be seen in FIG. 3, the ground 90 for each of the components is ground to the chassis that houses the high frequency power supply generator.

Problems associated with the prior art high frequency power supply generator depicted in FIG. 3, include its large size, high level of heat dissipation, and material cost due to the numerous components.

Therefore, it is desired to create a high frequency power supply generator that is highly reliable and inexpensive.

It is also desired to create a high frequency power supply generator that minimizes losses.

It is additionally desired to create a high frequency generator that minimizes the amount of heat generated.

It is further desired to create a high frequency power supply generator that is small in size to allow for easier integration into the overall system that utilizes the high frequency power supply generator.

SUMMARY OF THE INVENTION

An embodiment of the present invention comprises a high frequency power supply comprising a step down converter, a radio frequency amplifier coupled to the step down converter, a first winding coupled to the radio frequency amplifier, and a second winding magnetically coupled to the first winding.

Another embodiment of the present invention comprises a high frequency power supply generator comprising a first stage comprising an output providing radio frequency power and a first ground plane. The high frequency power supply further comprises a first inductor coupled to the first stage, a second inductor magnetically coupled to the first inductor, and a second stage coupled to the second inductor. The second stage comprising a second ground plane, wherein the first ground plane and second ground plane are electrically isolated from each other.

A further embodiment of the present invention comprises a high frequency power supply generator comprising means for generating variable magnitude power, a radio frequency amplifier coupled to the means for generating variable magnitude power, a first inductor coupled to the radio frequency amplifier, and a second inductor magnetically coupled to the first inductor.

It is an object of an aspect of the present invention to create a high frequency power supply generator that is reliable and inexpensive.

It is another object of an aspect of the present invention to create a high frequency power supply generator that produces low losses during operation.

It is yet another object of an aspect of the present invention to create a high frequency power supply generator that generates a minimum amount of heat.

It is an additional object of an aspect of the present invention to create a high frequency power supply generator that uses as few components as possible.

This and other objects and aspects of the present inventions are taught, depicted and described in the drawings and the description of the invention contained herein.

DETAILED DESCRIPTION OF THE PREFERRED EMBODIMENTS

Figure 4:
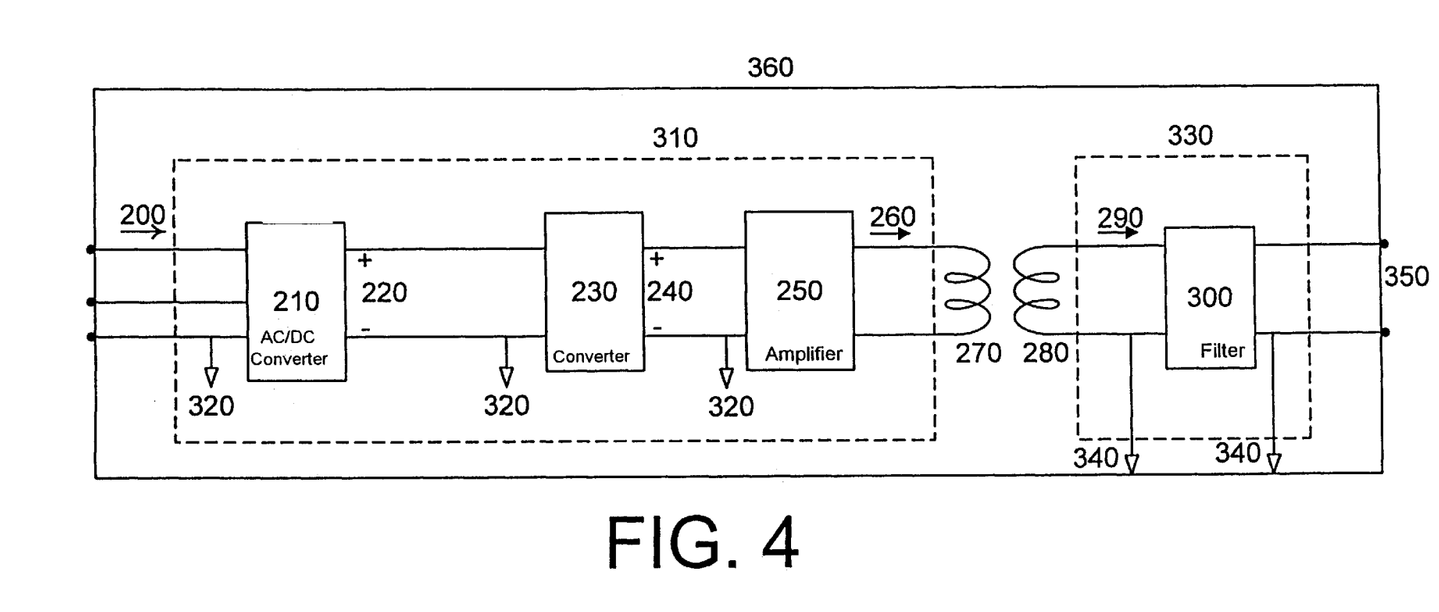
FIG. 4 is a presently preferred high frequency power supply generator according to the present invention.

Referring to FIG. 4, a power supply signal 200 is preferably a standard utility three phase AC Mains voltage, which in the United States preferably has an root mean square (rms.) magnitude of 208 volts and a frequency of 60 Hz. The power supply signal 200 is input into an AC to DC converter 210 that outputs a first average DC voltage 220 at a first magnitude, which is presently preferred to be approximately equal to 300 volts. The value of the first magnitude is dependent on the type of AC to DC converter 210 used, and is described in the discussion with respect to FIG. 6.

The output of AC to DC converter 210 is coupled to the input of step down converter 230, which provides a second average DC voltage 240 at its output. The second average DC voltage 240 preferably has a lower magnitude than the first average DC voltage 220. It is presently preferred that the output of step down converter 230 is variable and the magnitude of second average DC voltage 240 is variable according to user controlled settings. The presently preferred step down converter 230 comprises a switch that is capable of varying the magnitude of second average DC voltage 240.

The second average DC voltage 240 is supplied to the input of radio frequency amplifier 250. The radio frequency amplifier 250 is preferably capable of providing frequencies ranging from 10 KHz to 50 MHz. It is presently preferred that the radio frequency amplifier 250 provides high frequency power 260 at a fixed frequency of either 13.56 MHz or 27.12 MHz which is then capable of use to drive a load. The actual frequency of high frequency power 260 is variable according to user needs and settings.

The high frequency power 260 is provided to a first winding 270. The first winding 270 is preferably in close proximity to a second winding 280. Therefore, when high frequency power 260 is applied to first winding 270 a secondary voltage 290 is induced in second winding 280. The secondary voltage 290 induced in second winding 280 is at the same frequency as high frequency power 260. The secondary voltage 290 is fed through a filter 300 in order to minimize spikes and sags that may be part of high frequency power 260 due to the switching transients associated with radio frequency amplifier 250. The output of filter 300 is provided to output terminals 350 that can in turn be coupled to a load. It is presently preferred that the load has a nominal value of 50 Ohms.

In FIG. 4 a first stage 310 comprises AC to DC converter 210 and a step down converter 230. The first stage 310 has a first common ground plane 320. A second stage 330 comprising second winding 280, filter 300 and output terminals 305 has a second common ground plane 340, which is preferably the chassis 360 that houses the high frequency power supply generator. In a preferred embodiment, first ground plane 320 and second ground plane 340 are electrically isolated from each other.

The chassis 360 encloses the components of the high frequency power supply from the external environment. In a preferred embodiment, the chassis 360 allows the components to be sealed from the external environment, to prevent moisture, particles and other contaminants from interacting with the components of the high frequency power supply generator. In this arrangement, the high frequency power supply generator includes openings for input and output connections that are well sealed, except for leads.

The arrangement of FIG. 4, allows for an AC current to flow in first stage 310 and no current to flow in second stage 330 when the radio frequency amplifier 250 is off. When no current flows in second stage 330, an end user can disconnect, reconnect, or otherwise manipulate output terminals 350 without fear of injury, because the two output terminals 350 do not have a voltage induced across them.

The high frequency power supply of FIG. 4 has several advantages over known high frequency power supplies. The high frequency power supply depicted in FIG. 4 does not require a bulky and expensive transformer as shown in FIGS. 1, 2 or 3. Further, since the embodiment depicted in FIG. 4 does not require a transformer, the amount of heat dissipated in the preferred embodiment of FIG. 4 is less than the a prior art power high frequency power supply generator. Additionally, the lack of a transformer also decreases the size of the high frequency power supply generator, which increases the flexibility for a designer attempting to design in a high frequency power supply generator into a device utilizing the high frequency power.

Figure 5:
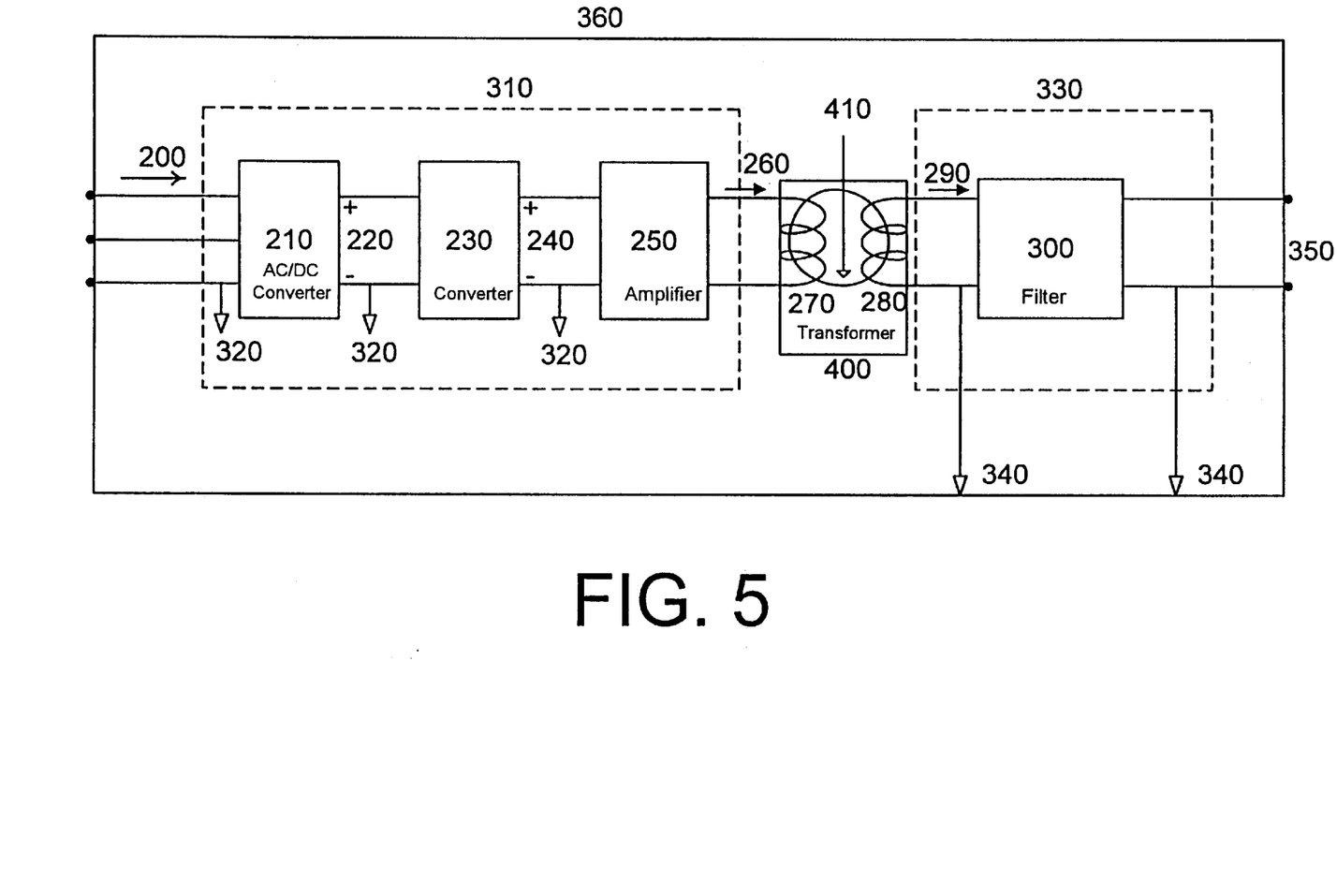
FIG. 5 is an alternate presently preferred high frequency power supply generator according to the present invention.

Referring to FIG. 5, in one embodiment first winding 270 and second winding 280 comprise a transformer 400. Transformer 400 can include a core 410, which may comprise plastic or other non-magnetic materials. Preferably, however, core 410 comprises air.

In both of the embodiments depicted in FIGS. 4 and 5, the high frequency power supply is capable of operating at levels of high efficiency equivalent to Class E levels of operation. The high level of efficiency is possible in part, because of the low losses of the presently preferred AC to DC converter 210 and the step down converter 230.

Figure 6:
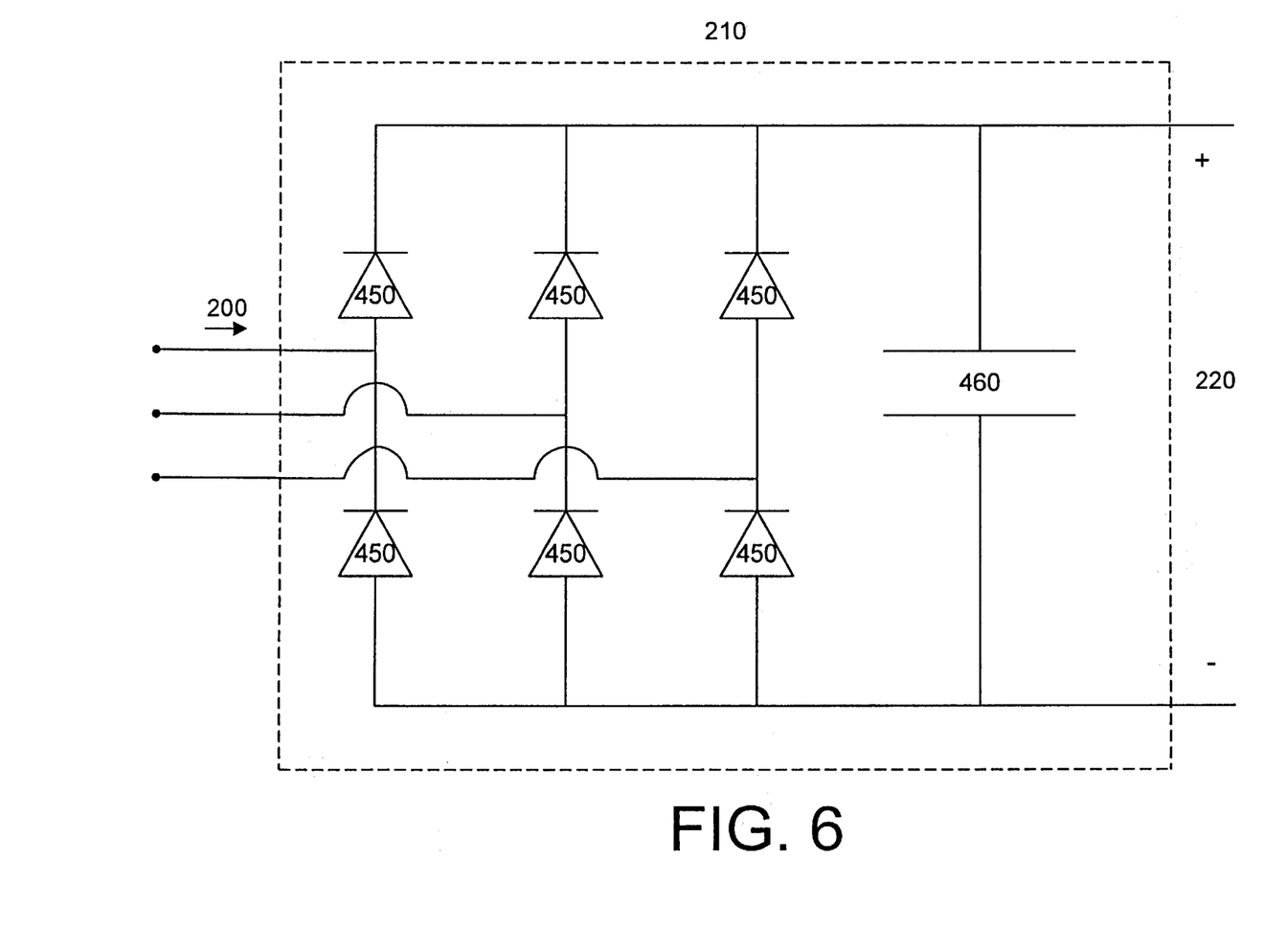
FIG. 6 is a presently preferred AC to DC converter according to a the present invention.

Referring to FIG. 6, a presently preferred AC to DC converter 210 comprises diodes 450 that receive three-phase AC mains voltage. The diodes 450 rectify the three-phase AC mains power supply voltage 200. The rectified voltage is transformed into first average DC voltage 220 by capacitor 460 which preferably has a capacitance large enough to generate a DC voltage from a rectified voltage. Alternatively, the diodes 450 can be replaced by a single-phase rectifier as is known in the art. The use of a single-phase rectifier would generate a lower magnitude for first average DC voltage 220 than the use of a three-phase rectifier as depicted in FIG. 6.

AC to DC converter topologies, other than the ones mentioned in the above discussion may be used by the present invention without departing from the spirit or the scope of the present invention, so long as a DC voltage is generated from an AC voltage.

Figure 7:
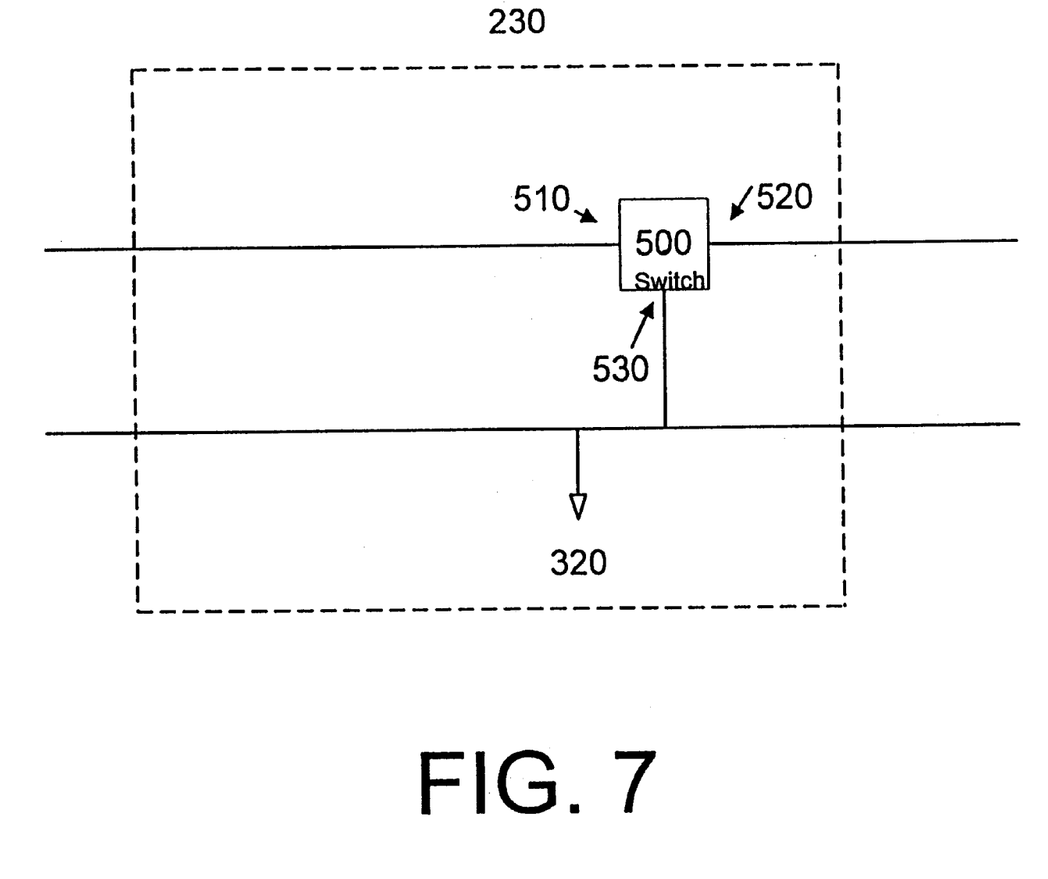
FIG. 7 is a presently preferred step down converter according to the present invention.

Referring to FIG. 7, step down converter 230, provides a variable magnitude voltage and power at its output, receives the first DC voltage 220. The first DC voltage 220 is input into switch 500 which comprises a first terminal 510, a second terminal 520 and a third terminal 530. The voltage provided by switch 500 at second terminal 520 is second average DC voltage 240, which has a magnitude that is variable depending on user controlled settings.

Other step down converter topologies may be used in place of a switch without departing from the scope or spirit of the present inventions. These include but are not limited to Buck topologies or resonant converters. However, the use of a switch which preferably operates on principles similar to a dimmer used to vary the voltage in light fixtures, allows for the minimization of the bill of materials cost for the high frequency generator as well as compactness of size.

Figure 8:
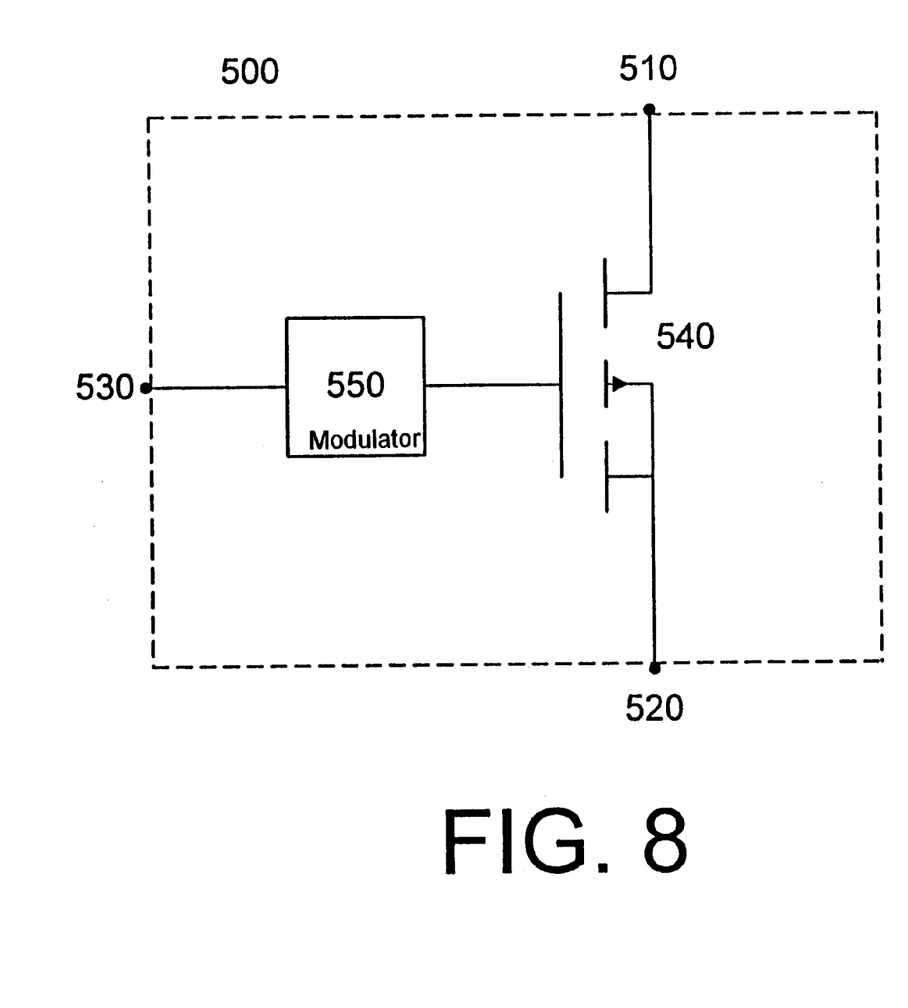
FIG. 8 is a preferred presently preferred switch according to the present invention.

Referring to FIG. 8, the presently preferred switch 500 comprises a pulse width modulator 550 that is used to switch MOSFET 540 at a desired duty cycle. The duty cycle generated by pulse width modulator 550 is variable and depends on settings controlled by a user of the device. The duty cycle of MOSFET 54 determines the second average DC voltage 240 that is then supplied to radio frequency amplifier 250.

The above described presently preferred switch is shown for purposes of illustration only, it is not intended to be limiting in any way, other circuit topologies and/or components which function as switches can be used by the present invention without deviating from the scope and teachings of the present invention.

Figure 9:
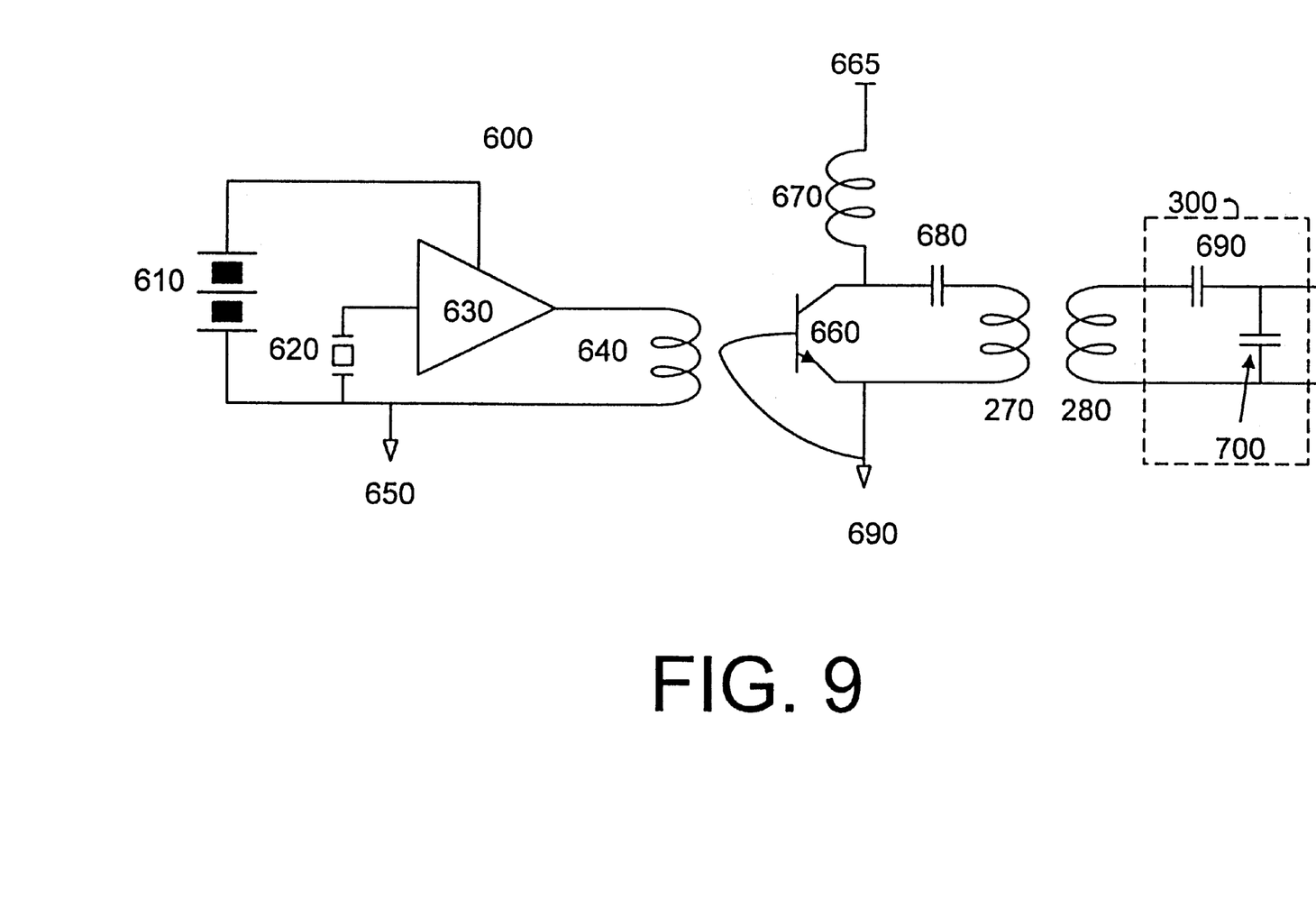
FIG. 9 is a presently preferred radio frequency amplifier according to the present invention.

Referring to FIG. 9, a presently preferred driver circuit 600 includes a DC voltage source 610 which is preferably a battery providing twenty-four (24) volts and five (5) amperes DC voltage source 610 is used to power operational amplifier 620 which oscillates according to a signal from a piezoelectric crystal oscillator 630 which operates at the frequency desired for the high frequency power. Windings 640 isolate the ground 650 of driver circuit 600 from ground 690 of transistor 660. The voltage provided at terminal 665 is second average DC voltage 240 supplied by the step down converter 230 and is coupled to choke 670. The transistor 660, which may be a BJT, MOSFET or other type of transistor, is switched on and off at the desired frequency, by a signal fed into its gate from driver circuit 600.

When transistor 660 conducts, no current flows through first winding 270 and no power is supplied to the load. When transistor 660 does not conduct, current flows through capacitor 680 and through winding 270 to generate a voltage across second winding 280. In this way a high frequency power is supplied to a load coupled to terminals 350.

Capacitors 690 and 700, which are coupled to the second winding 280 filter transients which are at higher frequency then the desired operational frequency of radio frequency amplifier 250, and act as filter 330.

Figure 10:
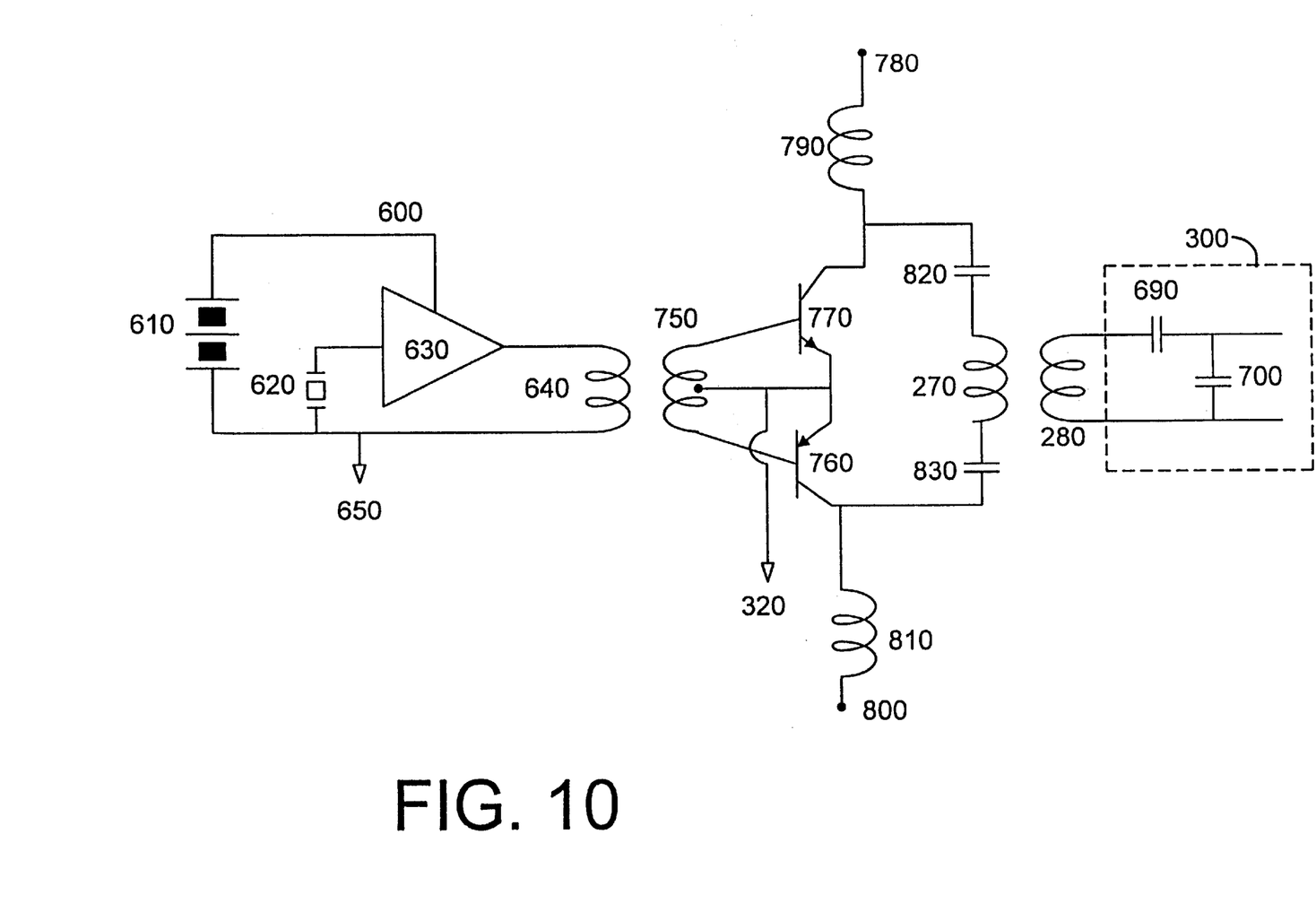
FIG. 10 is an alternate presently preferred radio frequency amplifier according to the present invention.

Referring to FIG. 10, an alternate embodiment of radio frequency amplifier 250 is shown. Driver circuit 600 that is used to drive transistors 770 and 780 is the same as described with respect to FIG. 9. In FIG. 10, both terminals 780 and 800 are coupled to second average DC voltage 240, allowing current to flow through either transistor 770 or 780 depending on the polarity of the voltage. Chokes 790 and 810 operate in the same manner as choke 670 of FIG. 8.

An advantage of the push-pull topology described with respect to FIG. 10 is that the voltage drop across transistors 780 and 800 is less that that of FIG. 9 due to the center tap of winding 750.

Figure 11:
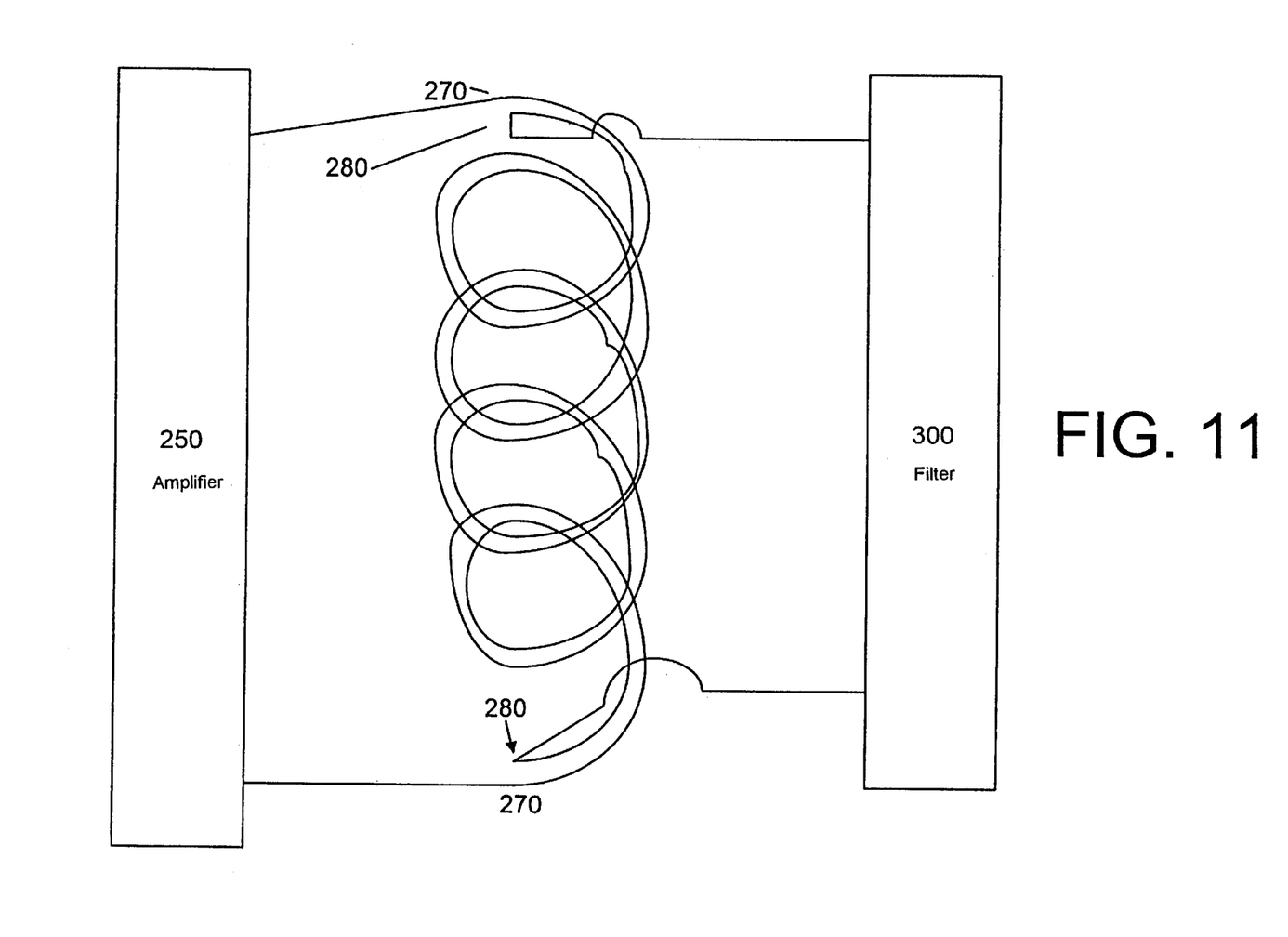
FIG. 11 is a presently preferred arrangement of windings according to the present invention.

Referring now to FIG. 11, a presently preferred arrangement of winding 270 and winding 280 is shown. Due to the close physical proximity of the windings as shown, a core of ferrite or other material is not required. Since, there is no core required there are no magnetization, eddy current, or hysterisis losses. Further, the heat dissipated by having only air between the coils is less than using other types of materials associated with transformers or the like.

As can be seen, by comparing FIGS. 1–3 to 4–7 the number of components used by the preferred high frequency supply is less than those in the prior art. Further, the lack of a power supply transformer and switching power supply reduces the size and bulk of the high frequency power supply generator, as well as the amount of heat generated.

While the embodiments, applications and advantages of the present invention have been depicted and described, there are many more embodiments, applications and advantages possible without deviating from the spirit of the inventive concepts described herein. The invention should therefore only be restricted in accordance with the spirit of the claims appended hereto and is not restricted by the preferred embodiments, specification or drawings.

What is claimed is:

1. A high frequency power supply comprising:
  an AC to DC converter comprising an AC to DC input and AC to DC output;
  a step down converter comprising a step down input and a step down output, said step down input coupled to said AC to DC output;
  a radio frequency amplifier comprising a RF input and a RF output, said RF input coupled to said step down output;
  a first winding comprising a first terminal and a second terminal, said first terminal and said second terminal coupled to said RF output; and
  a second winding magnetically coupled to said first winding wherein said first winding and said second winding comprise a transformer comprising an air core.

2. The high frequency power supply of claim 1 wherein said second winding comprises a first terminal and a second terminal and said high frequency power supply further comprising a filter comprising an input coupled to said first terminal and said second terminal of said second winding and an output.

3. The high frequency power supply of claim 1 wherein said input of said step down input comprises a first step down input terminal and a second step down input terminal, said step down output comprises a first step down output terminal and a second step down output terminal, and said step down converter comprises a switch comprising a first terminal coupled to said first step down input, a second terminal coupled to said first step down output terminal, and a third terminal coupled to said second step down input terminal.

4. The high frequency power supply of claim 3 wherein said switch comprises a transistor comprising a gate, a drain coupled to said first terminal of said switch and a source coupled to said second terminal of said switch and a pulse width modulator comprising an output coupled to said gate of said transistor.

5. The high frequency power supply of claim 3 wherein said AC to DC input comprises a first AC to DC input terminal, a second AC to DC input terminal and a third AC to DC input terminal, said AC to DC output comprises a first AC to DC output terminal and a second AC to DC output terminal, said AC to DC converter further comprises a three phase rectifier comprising a first input terminal coupled to said first AC to DC input terminal, a second input terminal coupled to said second AC to DC input, a third input terminal coupled to said third AC to DC input terminal, a first output terminal coupled to said first AC to DC output terminal and a second output terminal coupled to said second AC to DC output terminal, and a capacitor comprising a first terminal coupled to said first output terminal of said three phase rectifier and a second terminal coupled to said first AC to DC input terminal.

6. The high frequency power supply of claim 1 wherein said step down converter provides an output voltage comprising a magnitude, wherein said magnitude of said output voltage is variable.

7. The high frequency power supply of claim 1 wherein said RF output comprises a first RF output terminal and a second RF output terminal, said radio frequency amplifier comprises a transistor comprising a first terminal, a second terminal and a control terminal, said first terminal of said transistor coupled to said first RF output terminal and said second terminal of said transistor coupled to said second RF output terminal and said control terminal of said transistor coupled to an output signal produced by a controllable pulse generator.

8. The high frequency power supply of claim 1 wherein said radio frequency amplifier comprises a push-pull inverter.

9. The high frequency power supply of claim 1 wherein said AC to DC converter, said step down converter, said radio frequency amplifier, said first winding and said second winding comprise an enclosure isolated from an external environment.

10. The high frequency power supply of claim 1 wherein said device operates at level approximately equal to a Class E radio frequency amplifier.

11. A high frequency power supply generator comprising:

a first stage comprising an input coupled to receive a power supply voltage, an output providing radio frequency power, and a first ground plane;

a first inductor comprising first and second terminals coupled to said output of said first state;

a second inductor comprising first and second terminals, said second inductor being magnetically coupled to said first inductor; and a second state comprising an input coupled to said first and second terminals of said second inductor, an output, and a second ground plane, wherein said first ground plane and second ground plane are electrically isolated from each other and wherein said first inductor and said second inductor comprise a transformer having a core comprising air.

12. The high frequency power supply generator of claim 11 wherein said first stage comprises a radio frequency amplifier comprising an input and an output coupled to said first and second terminals of said first inductor.

13. The high frequency power supply generator of claim 11 wherein said first stage comprises, an AC to DC converter comprising an input coupled to said power supply voltage and an output, and a step down converter comprising an input coupled to said output of said AC to DC converter and an output coupled to said input of said radio frequency amplifier.

14. The high frequency power supply generator of claim 13 wherein said step down converter comprises a transistor comprising a gate, a drain coupled to said input of said step down converter and a source coupled to said output of said step down converter and a pulse width modulator comprising an output coupled to said gate of said transistor.

15. The high frequency power supply generator of claim 11 wherein said first inductor and said second inductor comprise a transformer.

16. The high frequency power supply generator of claim 11 wherein said first stage, said first winding, said second winding and said second stage comprise an enclosure that is substantially sealed from an external environment.

17. A high frequency power supply generator comprising:

an AC to DC converter comprising an input that receives an AC mains power supply voltage and an output;

means for generating a variable magnitude power, said means for generating a variable magnitude power comprising an input coupled to said output of said AC to DC converter and an output;

a radio frequency amplifier comprising an input coupled to said output of said means and an output;

a first inductor comprising first and second terminals coupled to said output of said radio frequency amplifier;

a second inductor comprising first and second terminals, said second inductor being magnetically coupled to said first inductor wherein said first and second inductor comprise a transformer comprising a core comprising a substantially non-magnetic material.

18. The high frequency power supply generator of claim 17 further comprising a filter comprising an input coupled to said first and second terminals of said second inductor and an output.

19. The high frequency power supply generator of claim 17 wherein said radio frequency amplifier comprises a transistor.

20. The high frequency power supply generator of claim 19 wherein said radio frequency amplifier comprises a push-pull inverter.

21. The high frequency power supply generator of claim 17 wherein said means for generating a variable magnitude power, said radio frequency amplifier, said first inductor and said second inductor comprise an enclosure that is substantially sealed from an external environment.

22. The high frequency power supply generator of claim 17 further comprising a first ground plane and a second ground plane wherein said means for generating a variable magnitude power, said radio frequency amplifier, and said first inductor each comprise a ground coupled to said first ground plane and wherein said second inductor comprises a ground coupled to said second ground plane.

* * * * *